US006991755B2

(12) United States Patent  
Reis et al.

(10) Patent No.: US 6,991,755 B2
(45) Date of Patent: Jan. 31, 2006

(54) SYNTACTIC TUNNEL CORE (75) Inventors: Carl Reis, Torrance, CA (US); Doris Reis, Torrance, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 384 days.

(21) Appl. No.: 10/417,519

(22) Filed: Apr. 17, 2003

(65) Prior Publication Data
US 2004/0207106 A1   Oct. 21, 2004

(51) Int. Cl.
B29C 73/00 (2006.01)
(52) U.S. Cl. .............................. 264/36.11; 264/DIG. 6; 156/98
(58) Field of Classification Search ............. 264/36.11, 264/36.15, DIG. 6; 523/218; 156/94, 98
See application file for complete search history.

(56) References Cited

U.S. PATENT DOCUMENTS 3,328,218 A   6/1967  Noyes
4,556,438 A * 12/1985 Hoffmeister et al. .......... 156/79
4,774,121 A *  9/1988 Vollenweider, II .......... 428/117
4,961,799 A   10/1990 Cologna et al.
5,547,629 A    8/1996 Diesen et al.
5,612,117 A    3/1997 Belanger et al.
5,653,836 A *  8/1997 Mnich et al. ................. 156/98
5,741,574 A    4/1998 Boyce et al.
5,773,121 A    6/1998 Meteer et al.
5,868,886 A    2/1999 Alston et al.
6,149,749 A   11/2000 McBroom

* cited by examiner

Primary Examiner—Allan R. Kuhns
(74) Attorney, Agent, or Firm—Stetina, Brunda, Garred & Brucker (57) ABSTRACT A technique and tool are provided for repairing damaged areas of honeycomb structures. The tool includes a plurality of rods axially translatable into the damaged area. Foam material is inserted about the rods and allowed to cure. The rods are later withdrawn leaving a porous core of material. Sleeves may be provided to receive and support the rods as they translate into the damaged area. The sleeves may remain in the damaged area after the rods are withdrawn into the sleeves.

62 Claims, 7 Drawing Sheets

SYNTACTIC TUNNEL CORE

CROSS-REFERENCE TO RELATED APPLICATIONS (Not Applicable)

STATEMENT RE: FEDERAL SPONSORED RESEARCH/DEVELOPMENT (Not Applicable)

FIELD OF INVENTION

The present invention relates to an apparatus and technique useful to repair honeycomb core structures, such as used in unmanned aircraft, small submersibles and the like.

BACKGROUND OF THE APPLICATION

Many contemporary aircraft have honeycomb sandwich structures formed in the wing leading edges. In the course of use the leading edges may sustain damage, e.g. from bird strikes and accidents during maintenance.

In some cases a honeycomb core may be crushed proximate the point of impact, but the outer skin may not show any visual damage at that location. The resulting core shear failure may extend over a larger area than the original damaged area. Such unseen core damage may result in the outer skin buckling and delaminating under stress.

Repair of the damage may require skin and core repair operations, either in the field or in a repair depot. A replacement core specific to that wing must be matched to correctly restore the aircraft's integrity. However, maintaining a stock of cores specific to each aircraft is logistically challenging, especially during field operations.

In accordance with contemporary repair techniques damaged skin and the adjacent honeycomb core are completely removed to the opposing skin. A replacement core may be shaped and sanded to fit snugly into the area being repaired. Replacement material may be selected to substantially match the original case material. However, conformity of the materials does not insure conformity to the structural and mechanical properties of the honeycomb shaped core. One type of replacement material is syntactic foam, an epoxy resin material that contains glass micro-balloons. This material can be tailored to different densities and properties. However the material may be too heavy for certain applications. Moreover, the material is isotropic in nature, i.e. the strength is equal in all directions, which may be undesirable or at least differ from the honeycomb properties of the adjacent structure.

For reference, several prior art methods to repair aircraft laminates are described below. U.S. Pat. No. 6,149,749 discloses a patch used to cover the damaged area, without any replacement of the original structure, including the lightweight structure between the two outer skins. The patch has apertures that allow air to be removed from below the patch thereby improving the adhesion.

U.S. Pat. No. 4,961,799 discloses a method for repairing damaged areas by bolting or bolt bonding a repair patch on the outer surfaces of the damaged material. This method does not provide a matching replacement honeycomb structure.

U.S. Pat. No. 5,741,574 discloses a truss reinforced sandwich structure that uses fiber bundles or tows cured in very small diameters; the preferred method of the attachment being stitching the foam core within the face sheets or laminates. U.S. Pat. No. 3,328,218 discloses using rigid filaments to manufacture the core structure. In both references the filaments must be fastened to the outer plies. Moreover, the references require the foam to be under compressive pressures of 50 to 90 psi.

U.S. Pat. No. 5,612,117 discloses an anchoring means comprising an insert introduced into a hole in the skins and held in place by the core to provide an anchoring of the entire structure.

U.S. Pat. No. 5,773,121 describes a syntactic form core structure that is produced using a powdered resin instead of a liquid resin. In order to improve or modify characteristics of the resultant structure, chopped fibers or pre-built honeycomb structure is added to the powered resin, before curing.

U.S. Pat. No. 5,547,629 discloses a method using rubber mandrels to fabricate hollow structures such as a wing. After the two skins are compressed together, with the mandrels in the hollow cavities providing support, the mandrels are pulled from one end. As they stretch, they contract and can be removed from the molded part. No foam honeycomb structure is introduced during the molding process.

U.S. Pat. No. 5,868,886 discloses the use of Z-pins to provide a mechanical link between the patch/parent structures. It suggests removal of the pins, leaving holes that are filled when the patch material is introduced into the repair area. Small pin sizes are used in order to reduce associated structural degradation caused by fiber breakage due to concentrated stress.

BRIEF SUMMARY OF THE INVENTION

It is an object of this invention to provide an improved method for repairing structures having outer skins and an inner honeycomb core structure.

It is another object of this invention to provide a repair method that can be implemented in-site or at a facility to separate from the aircraft.

It is an additional object of this invention to reduce the weight of the syntactic foam by displacing a part of the volume of foam with air tunnels.

It is a further object of this invention to regulate the structural or mechanical characteristics of the replacement core by selection of the core angle(s), number of layers and choice of materials. It is a further object of this invention to reduce the inventory of core specific parts that must be matched with a particular aircraft, which creates a logistic nightmare, especially during field operations.

In order to reduce the inventory of specific foam cores, a small number of tools can be kept that will allow syntactic tunnel cores to be fabricated as needed. The tooling can be used to produce these syntactic tunnel cores both off or on the vehicle. The tooling utilizes metal rods that are removable and are held in place with at least 2 rod guide plates. The mechanisms, to hold the tooling in place for repair work both off and on the vehicle, may be the same depending on the area to be reworked.

If the repair is to be accomplished off aircraft, then the first step is typically to remove the damaged skin and inner honeycomb core. This damaged area is normally removed to the opposite skin. If both skins are damaged, one skin is typically repaired first. The tooling that holds the removable rods may be positioned above a container or tray. This tray is typically deeper and larger than the scraped out area.

The removable rods are placed into the aligning holes in the rod guide plates and positioned in the cavity created in the tray. The syntactic foam may be introduced into the cavity, surrounding the removable rods. Once the foam has cured, the removable rods may be removed and the tooling is extracted. The top and bottom surface of the replacement syntactic tunnel core is now shaped to match the final surface shapes and the original core shape. The shaping of the replacement tunnel core include matching the physical shape of the scraped outer area. The outer skin can now be repaired using contemporary skin replacement techniques.

The core tunnels made from the space taken up by the removable rods may all be the same geometric shape or vary across the replacement tunnel core. The most common shapes are circular or hexagonal cylindrical tunnels.

The shape of the tunnels may be a series of graduated sectional profiles narrowing in the direction of the tunnel depth. Preferably there are no undercuts that may damage the tunnel shapes upon the extraction of the removable rods.

The angle of the tunnels may typically be perpendicular to the direction of the load of the structure or outer surface or may be offset from the being perpendicular. Alternatively, to implement selective structural or mechanical features, the tunnels may be bored at other angle/gradients. A 5-degree offset, for example, will increase the shear characteristics.

During the process, the metal rods may be heated or cooled in accordance with predetermined temperature probes, to regulate the final structural characteristics or speed up the curing process.

The technique and tool used to implement repaired damaged honeycomb structures is as follows. The tool includes a plurality of rods axially translatable into the damaged area. Foam material is inserted about the rods and allowed to cure. The rods are later withdrawn, leaving a porous core of material. Sleeves may be provided to receive and support the rods as they translate into the damaged area. The sleeves may remain in the damaged area after the rods are withdrawn into the sleeves.

Rods may be formed to have various cross-sectional areas, such as circular, hexagonal, or other geometric shapes. Rods may be inserted into the area at different angles relative to the load flow in the damaged area. The particular angle at which the rods are inserted into the damaged area may be selected to increase the sheer strength or other properties of the honeycomb structure, or to match the properties of the particular remaining structure.

In one embodiment the rods may be heated, or the temperature otherwise regulated in order to facilitate curing of the foam material to produce desired properties.

In another embodiment the foam may be inserted in sequential applications to define a series of separate layers, wherein each layer may be formed of different material, and/or cured in accordance with different profiles, in order to achieve a desired set of core/structure properties.

DETAILED DESCRIPTION OF THE INVENTION

Figure 1:
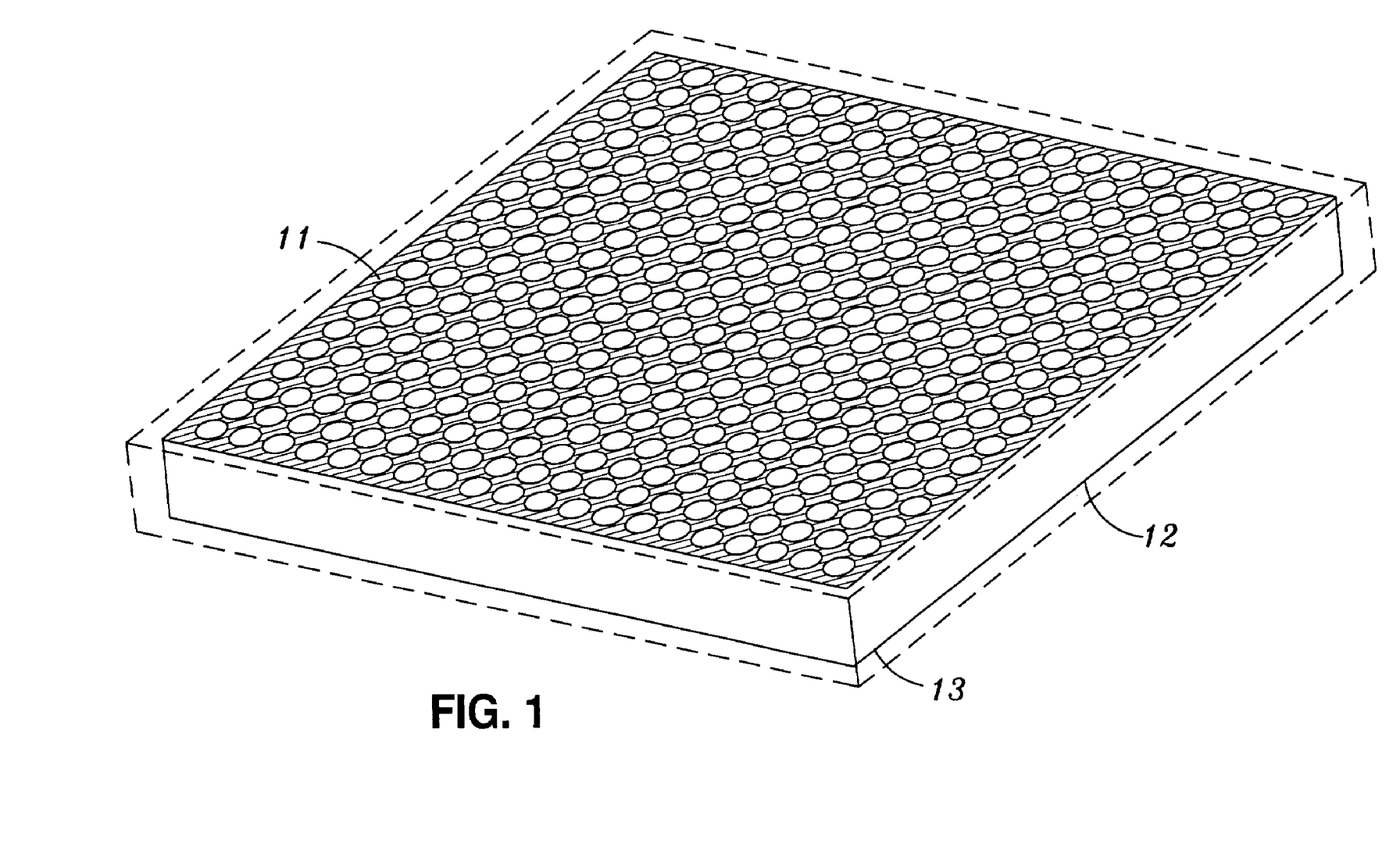
FIG. 1 is an illustration of the parts of an aircraft structure.

The aircraft or vehicle structure 10 is shown in FIG. 1. The structure 10 is made up of two exterior skins 11 and 13. Sandwiched between the skins 11 and 13 is a honeycomb structure 12. Skin 11 is illustrated in a translucent rendering so that the honeycomb structure 12 can be seen. This honeycomb structure 12 is used to not only reduce the weight of the overall structure 10, but also to provide the required characteristics for a specific application. The tunnels or air pockets of the honeycomb structures can be of any geometric shape.

Figure 2:
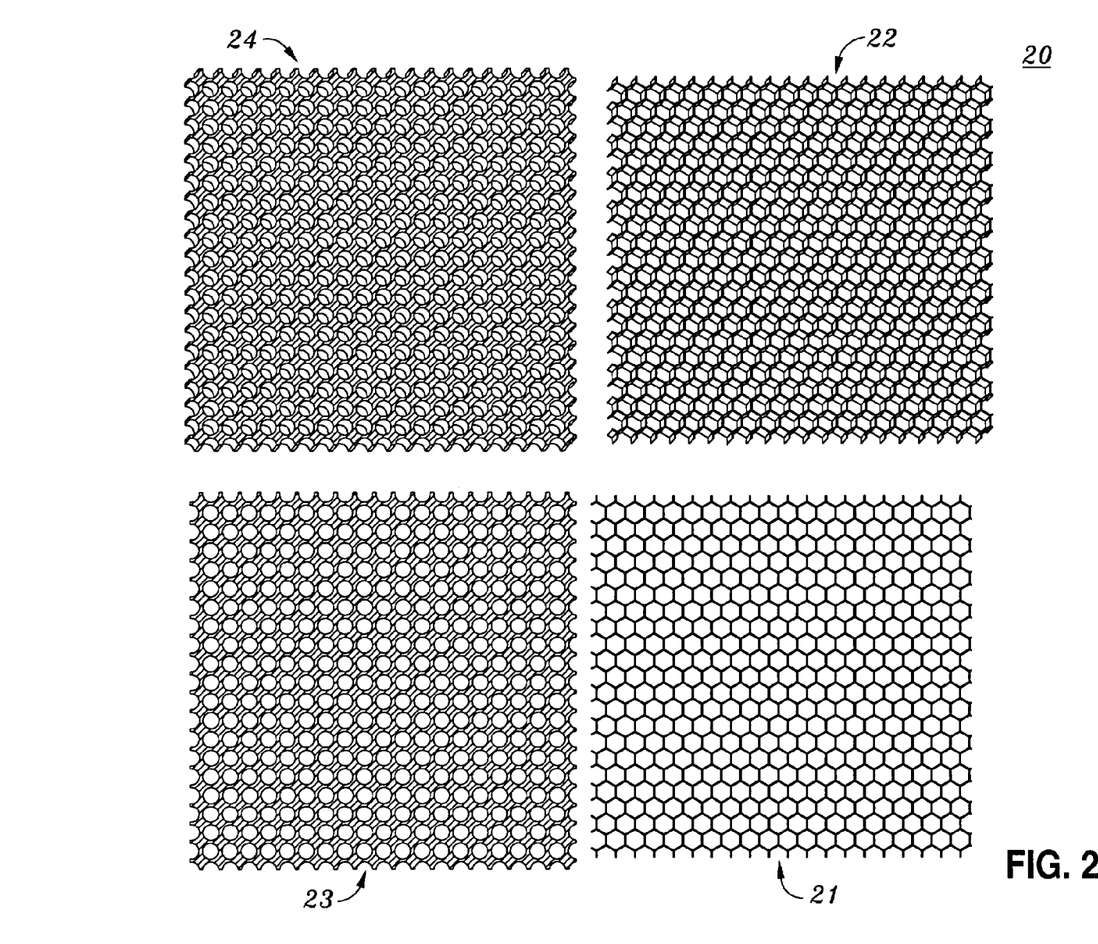
FIG. 2 contains views of two types of honeycomb structures.

FIG. 2 shows two different honeycomb structure geometric shapes from two viewing angles 20. The honeycomb views, 23 and 24 are from different elevations, based on a circular, cylindrical rod. The honeycomb views, 21 and 22, are based on a hexagonal cylindrical rod.

The characteristics of the honeycomb structure can be made directional, whether mechanical, electrical or dielectric, by controlling the amount of holes, their sizes, their geometric shape, their sectional views, their direction, syntactic resin wall thickness and strength, composition of the syntactic material and/or temperature/pressure curing profiles. The shape of the tunnels, and their angles to the direction of the load of the honeycomb structure can further be varied across the face of the repaired area.

Figure 3:
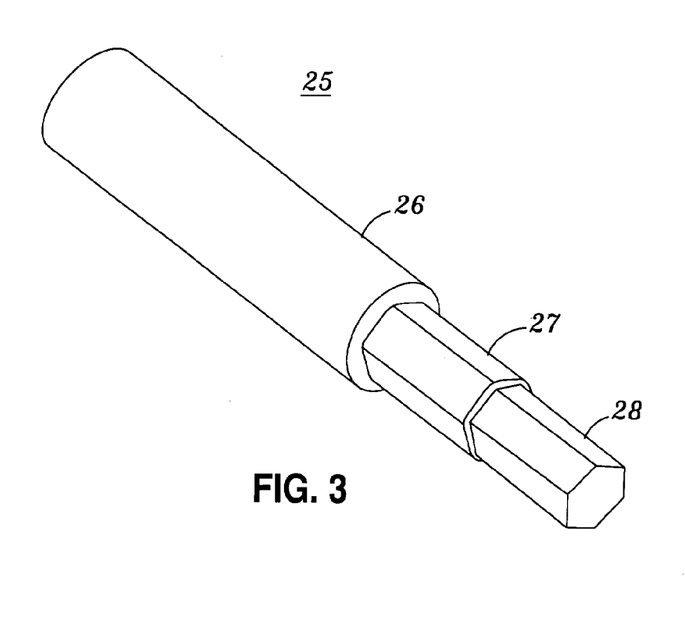
FIG. 3 is an illustration of a removable pin with multiple geometric shapes.

FIG. 3 illustrates a removable rod 25, that includes multiple geometric shapes on a single rod. It shows a rod with three geometric shapes, a larger circle 26, a smaller circle 27 just below the larger circle 26, and a hexagonal shape 28 just below the smaller circle 27. Draft may be added to any of the geometric shapes. The only design preference is that the removable rod be capable of being pulled out of the cured honeycomb core. Undercuts could damage the core, by scraping out part of the core.

It is also within the scope of this invention to use layers of syntactic foam, with each having different properties, to introduce structural gradients or otherwise improve matching to the surrounding honeycomb structure.

Figure 4:
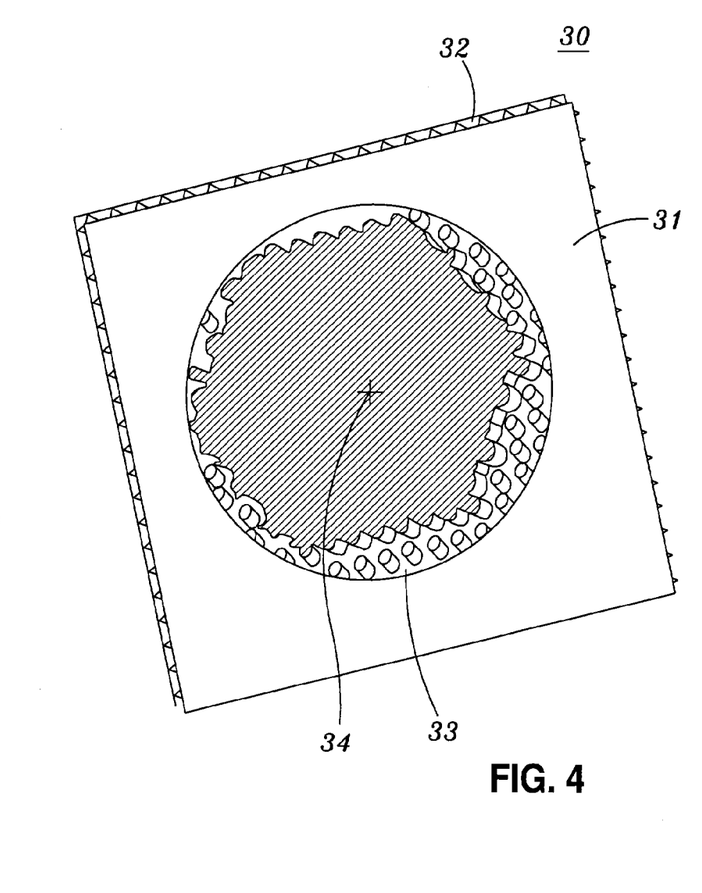
FIG. 4 is a view of a damaged honeycomb section after removal of the damaged honeycomb section

FIG. 4 shows an area of the aircraft structure 30 that was damaged, and the repair has been started. Though hitting an object, such as by a bird or a projectile, could damage both skins 31 and 32, FIG. 4 assumes that only the top skin 31 is damaged. First, the damaged portion of the skin 31 is removed as show as a circle of material missing from skin 31. The honeycomb internal structure 33 is thereby exposed. The damaged area is normally removed down to the undamaged skin 32 and the removed area 34 is hexagonal in the shape for clarity. It is also possible that the damaged area of the honeycomb structure 33 will not require the entire removal of the honeycomb structure down the other skin 32 surface.

Now that the damaged honeycomb area 34 has been removed, a replacement must be fabricated. This can be accomplished offsite or directly on the vehicle. The decision is based on several factors, including the location of the structure being repaired. In a repair depot, when room safety is more readily insured, the fabrication of the syntactic tunnel core will most likely be performed on the vehicle. In the field, especially in war theater, the fabrication of the syntactic tunnel core would more likely be accomplished off the vehicle.

Figure 5A:
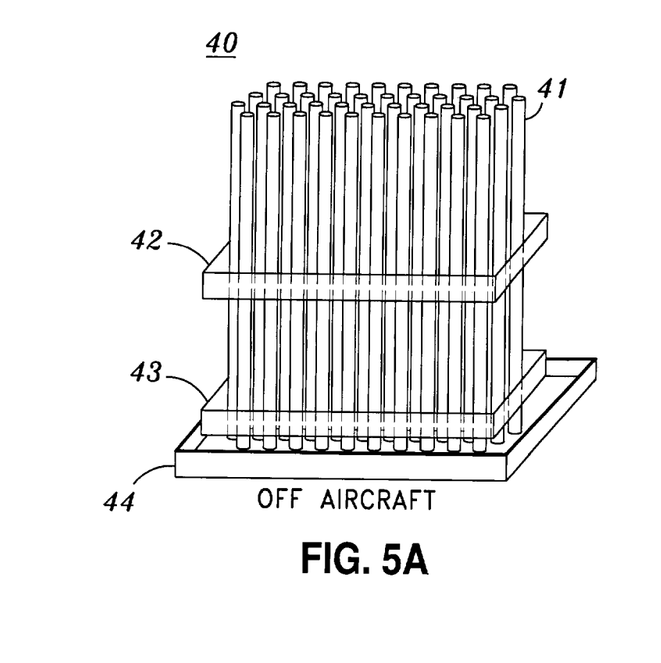
FIG. 5A is a view of the tooling that is utilized to fabricate the syntactic tunnel core off of the aircraft.

FIG. 5A shows the fabrication tooling 40 for a syntactic tunnel core that is fabricated offsite or off the aircraft. The fabrication tool 40 basically consists of a housing including at least guide plates 42 and 43 and a number of extendable rods 41. The rods 41 in FIG. 5A are typically of circular, cylindrical shape, and adapted for axial movement within the guide plates. As will be apparent to those in the field, the rod shapes may alternately be of other geometric shapes as shown in FIG. 2 and FIG. 3. The outer mechanism used to position the plates above the work area may be any of a number of different mechanisms that are well known in the industry.

Figure 8:
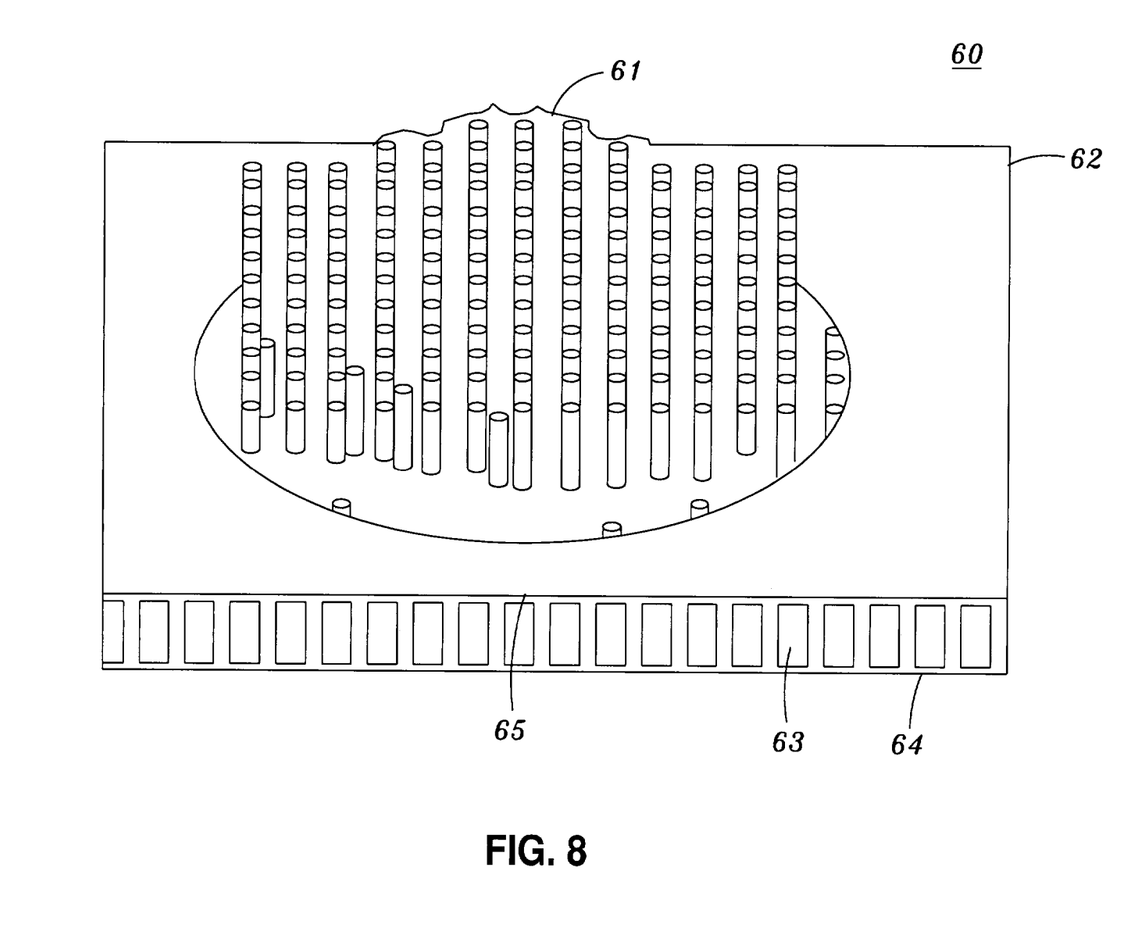
FIG. 8 is an illustration of the placement of the plug into the removed damaged honeycomb area.
Figure 9:
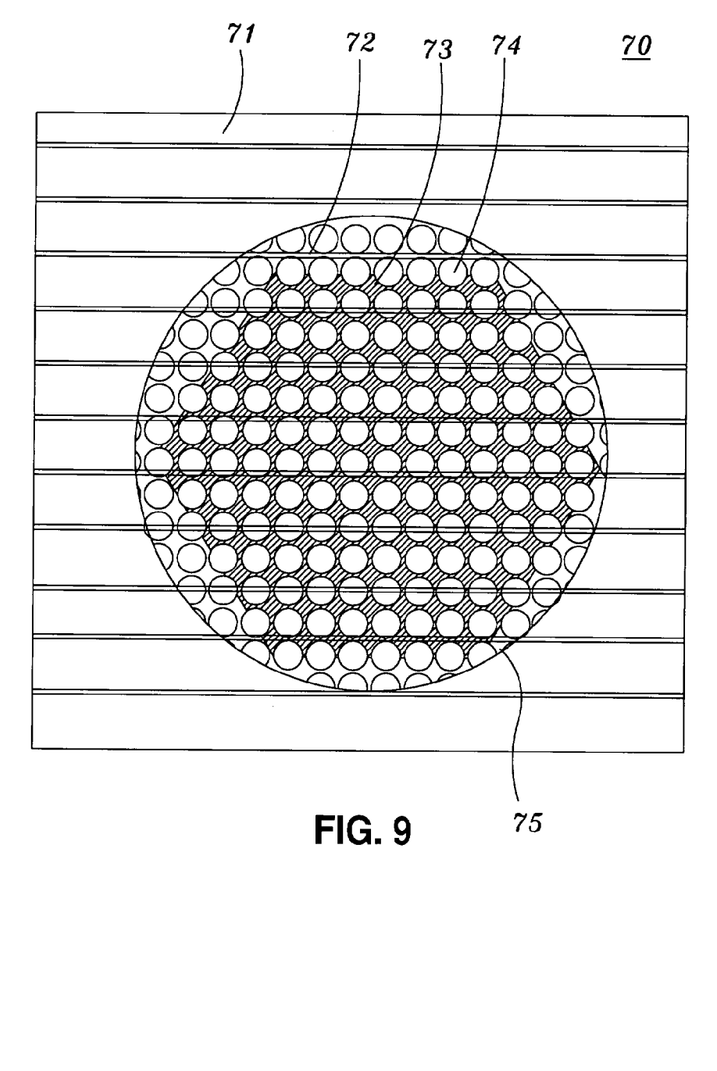
FIG. 9 is a top view of the replacement honeycomb plugs in the aircraft structure.

The removable rods 41 may be positioned into a container or tray 44 of an appropriate depth, typically at least as deep as the removed area 34, as shown in FIG. 4. Syntactic foam is then placed into the remaining cavity of the tray 44 and allowed to cure. If required, the removable rods 46 can be heated or cooled to reduce the cure time or to maintain a temperature to achieve selected properties in the cured foam. The rods 46, are then removed leaving a replacement syntactic tunnel core tray-shaped structure. This syntactic tunnel core structure may be shaped to fit into the cavity 34 of FIG. 4. The final shape of the syntactic tunnel core 55 mates with the cavity 65 is shown in FIG. 8. The mated replacement honey tunnel core and original honeycomb core is shown in FIG. 9.

Figure 5B:
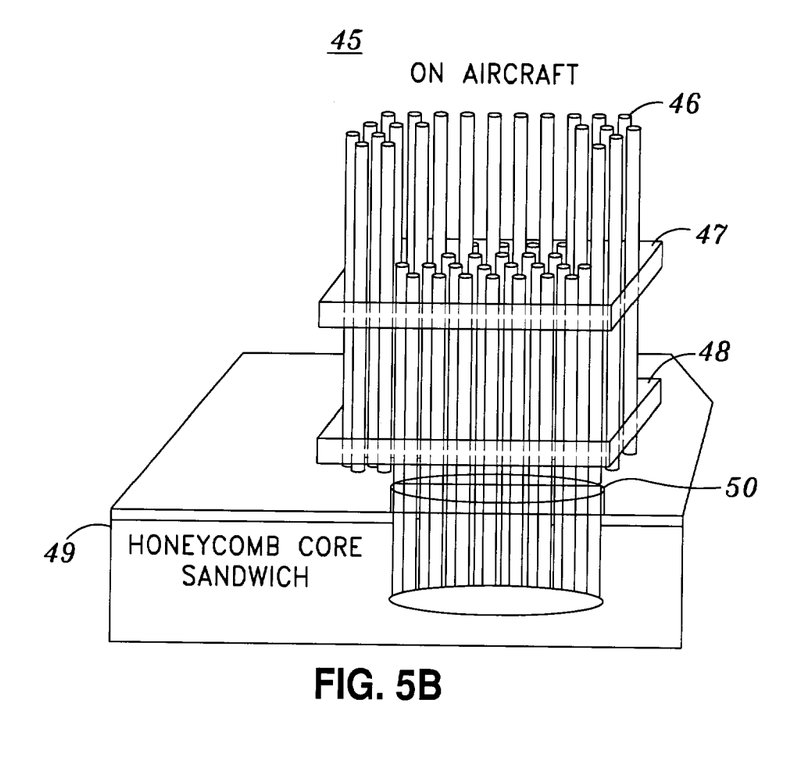
FIG. 5B is a view of the tooling that is utilized to fabricate the syntactic tunnel core on the aircraft.

FIG. 5B shows the fabrication tooling 44 for a syntactic tunnel core that is fabricated on aircraft. The fabrication tooling 45 is basically consisting of at least 2-rod guide plates 47 and 48 and a number of removable rods 46. The rods 46 in FIG. 5B are a circular, cylindrical shape. The shape may be other geometric shapes as shown in FIG. 2. The rods or rod guide plates may, depending on the honeycomb design, be made up of several sections that are mechanically fastened together. The plate sections may contain aperture patterns that are different from the other plate sections, so that the properties of the final syntactic tunnel core replacement is better matched to the original honeycomb core. Once the fabrication tooling 45 is in place, the syntactic foam material can then be poured into the remaining cavity of the removed area 34. The syntactic foam is allowed to cure. If required, the removable rods 46 can be heated or cooled at selected thermal profiles to reduce the cure time, or to regulate the temperature to achieve described properties in the cured foam. The rods 46 are removed, leaving a replacement syntactic tunnel core structure 73 as shown in FIG. 9.

Figure 6:
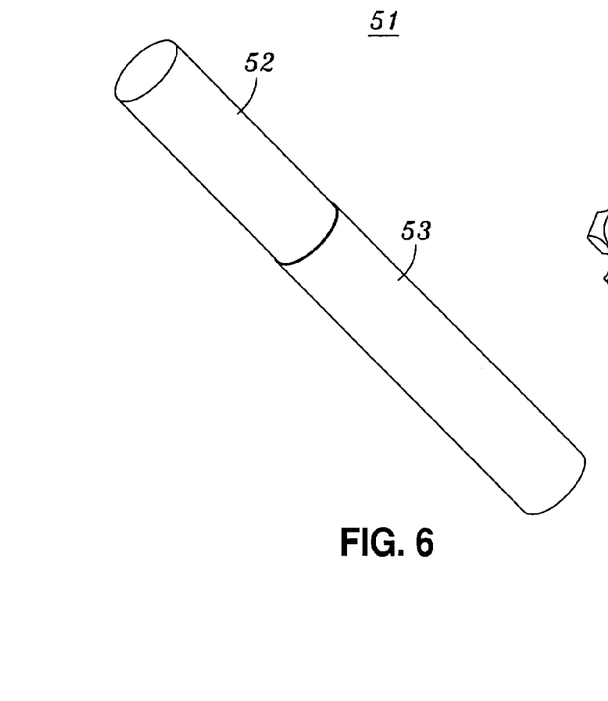
FIG. 6 is an illustration of a removable plug and insert.

FIG. 6 illustrates a rod set 51. Sleeve 53 is placed on the first end of the rod 52, which will have syntactic foam material placed around it. The sleeve 53 may remain in the tunnel core after removal of rod 52, any may be thermally or otherwise controlled to provide additional desired core properties. The sleeve 53 may be made of Teflon or any material that will provide desired characteristics.

Figure 7:
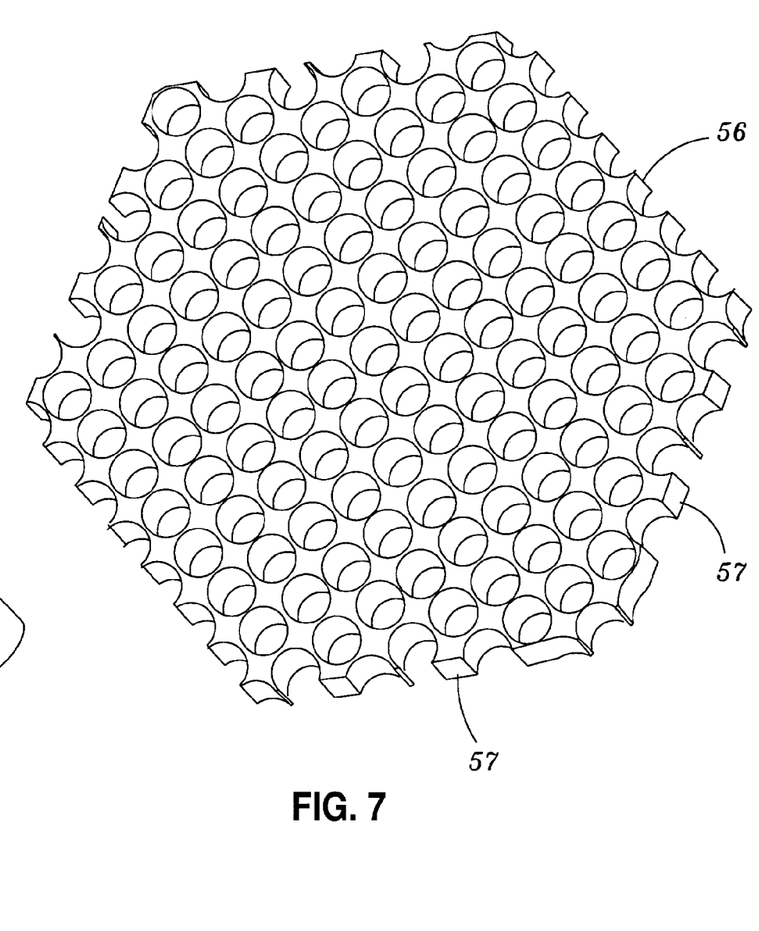
FIG. 7 is a view of an off-aircraft repair plug.

FIG. 7 illustrates a completed off aircraft fabricated syntactic tunnel core 56. The shape of the edges 57 are fabricated to fit properly within the cavity in the repair area 65 as shown in FIG. 8.

The off aircraft fabricated replacement syntactic tunnel core 56 may be placed into the cavity 65 of the original honeycomb core 63. As shown in FIG. 8 the shape defined by the edges of core 61 mate with the shape defined by the edges of the cavity 65. The procedure to fasten the core 61 to the undamaged skin 64 may then proceed in accordance with standard repair procedures.

FIG. 9 shows the top view of a repaired honeycomb area 70. The repaired area may have been fabricated off aircraft or on aircraft. Within the repaired area 70, the dark hexagonal shaped area is the replacement syntactic tunnel core 73 of the present invention. The lighter colored syntactic tunnel core 72 is the original undamaged tunnel core. The bottom skin 74 supports the bottom of the replacement tunnel core 73. The upper surface of the replacement core 73 must be shaped to match the upper surface shape of the original core 72. Once the surfaces are uniform between the two cores 72 and 73, then a patch can be added to close the opening hole 75 in the damaged skin 71. The patch is not shown.

The shear strength of the core with tunnels perpendicular to the skins is low. If desired, the rods 41 or 45 can be positioned at an angle that is not perpendicular to the load path direction. Even a 5-degree offset will increase the load angle. The angle selected is based on the desired characteristics.

It is understood that although the above represents several embodiments of the invention, the invention may take a wider variety of embodiments intended to effect alternate designs or additional features. Such embodiments are within the scope and spirit of the present invention.

What is claimed is:

1. A method for fabricating a replacement honeycomb foam tunnel core of a vehicle that has a damaged section of honeycomb core comprising the steps of;
   a. disposing a plurality of removable rods within an area where the replacement honeycomb foam tunnel core is to be fabricated;
   b. filling the area about the removable rods with syntactic foam;
   c. curing the syntactic foam; and
   d. retracting the rods to define a perforated replacement core;
   e. wherein the rods are disposed in the area while the damaged section remains on the vehicle.

2. The method of claim 1 further comprising disposing tooling over an area where the foam tunnel core is to be fabricated, wherein the tooling comprises a plurality of rod guide plates.

3. The method of claim 1 further comprising the step of scraping the damaged section of honeycomb core, to form the area where the replacement foam tunnel core is to be fabricated.

4. The method of claim 1 wherein the step of filling the area with foam includes sequentially applying layers of foam, at least one layer having a different foam formulation.

5. The method of claim 1 further comprising the step of removing excess syntactic foam from the replacement honeycomb foam core to conform the replacement honeycomb foam core to the original shape of the honeycomb core.

6. The method of claim 2 wherein the tooling is disposed offsite of the location of the vehicle.

7. The method of claim 1 wherein the rods are of a common geometric shape and size.

8. The method of claim 7 wherein the rods have a circular cross section.

9. The method of claim 7 wherein the rods have a hexagonal cross section.

10. The method of claim 1 where the rods have a graduated diameter along a longitudinal axis of the rods.

11. The method of claim 1 wherein the rods are arrayed at an angle offset from normal to the path direction of load forces in the honeycomb core.

12. The method as resulted in claim 11 wherein the offset angle is selected to regulate shear strength of the honeycomb structure.

13. The method of claim 11 wherein the offset angle is about 5-degrees.

14. The method of claim 11 wherein the offset angle of the plurality of removable rods varies across the foam tunnel core.

15. The method of claim 1 further comprising the step of placing sleeves over at least some of the rods prior to inserting the rods into the cavity, the sleeves remaining in the replacement honeycomb foam tunnel core after the rods are withdrawn from the sleeves.

16. The method of claim 1 wherein the curing step includes regulating the temperature of the plurality of removable rods to regulate curing and characteristics of the replacement honeycomb foam tunnel core.

17. A method for fabricating a replacement honeycomb foam tunnel core of a vehicle that has a damaged section of honeycomb core comprising the steps of;
   a. scaping the damaged section of honeycomb core, to form the area where the replacement foam tunnel core is to be fabricated;
   b. disposing a plurality of removable rods within the area where the replacement honeycomb foam tunnel core is to be fabricated;
   c. filling the area about the removable rods with syntactic foam;
   d. curing the syntactic foam; and
   e. retracting the rods to define a perforated replacement core.

18. The method of claim 17 wherein the step of filling the area with foam includes sequentially applying layers of foam, at least one layer having a different foam formulation.

19. The method of claim 17 wherein the rods are disposed in the area while the damaged section remains on the vehicle.

20. The method of claim 17 wherein the rods have circular cross section.

21. The method of claim 17 wherein the rods have a hexagonal cross section.

22. The method of claim 17 where the rods have a graduated diameter along a longitudinal axis of the rods.

23. The method of claim 17 wherein the rods are arrayed at an angle offset from normal to the path direction of load forces in the honeycomb core.

24. The method of claim 17 wherein the offset angle is selected to regulate shear strength of the honeycomb structure.

25. The method of claim 17 wherein the offset angle of the plurality of removable rods varies across the foam tunnel core.

26. The method of claim 17 further comprising the step of placing sleeves over at least some of the rods prior to inserting the rods into the cavity, the sleeves remaining in the replacement honeycomb foam tunnel core after the rods are withdrawn from the sleeves.

27. A method for fabricating a replacement honeycomb foam tunnel core of a vehicle that has a damaged section of honeycomb core comprising the steps of;
   a. disposing a plurality of removable rods within an area where the replacement honeycomb foam tunnel core is to be fabricated;
   b. filling the area about the removable rods with sequentially applied layers of syntactic foam, at least one layer having a different foam formulation;
   c. curing the syntactic foam; and
   d. retracting the rods to define a perforated replacement core.

28. The method of claim 27 further comprising the step of scraping the damaged section of honeycomb core, to form the area where the replacement foam tunnel core is to be fabricated.

29. The method of claim 27 wherein the rods are disposed in the area while the damaged section remains on the vehicle.

30. The method of claim 27 wherein the rods have a circular cross section.

31. The method of claim 27 wherein the rods have a hexagonal cross section.

32. The method of claim 27 where the rods have a graduated diameter along a longitudinal axis of the rods.

33. The method of claim 27 wherein the rods are arrayed at an angle offset from normal to the path direction of load forces in the honeycomb core.

34. The method of claim 27 wherein the offset angle is selected to regulate shear strength of the honeycomb structure.

35. The method of claim 27 wherein the offset angle of the plurality of removable rods varies across the foam tunnel core.

36. The method of claim 27 further comprising the step of placing sleeves over at least some of the rods prior to inserting the rods into the cavity, the sleeves remaining in the replacement honeycomb foam tunnel core after the rods are withdrawn from the sleeves.

37. A method for fabricating a replacement honeycomb foam tunnel core of a vehicle that has a damaged section of honeycomb core comprising the steps of
   a. disposing a plurality of removable rods within an area where the replacement honeycomb foam tunnel core is to be fabricated, the rods having a hexagonal cross section;
   b. filling the area about the removable rods with syntactic foam;
   c. curing the syntactic foam; and
   d. retracting the rods to define a perforated replacement core.

38. The method of claim 37 further comprising the step of scraping the damaged section of honeycomb core, to form the area where the replacement foam tunnel core is to be fabricated.

39. The method of claim 37 wherein the step of filling the area with foam includes sequentially applying layers of foam, at least one layer having a different foam formulation.

40. The method of claim 37 wherein the rods are disposed in the area while the damaged section remains on the vehicle.

41. The method of claim 37 where the rods have a graduated diameter along a longitudinal axis of the rods.

42. The method of claim 37 wherein the rods are arrayed at an angle offset from normal to the path direction of load forces in the honeycomb core.

43. The method of claim 37 wherein the offset angle is selected to regulate shear strength of the honeycomb structure.

44. The method of claim 37 wherein the offset angle of the plurality of removable rods varies across the foam tunnel core.

45. The method of claim 37 further comprising the step of placing sleeves over at least some of the rods prior to inserting the rods into the cavity, the sleeves remaining in the replacement honeycomb foam tunnel core after the rods are withdrawn from the sleeves.

46. A method for fabricating a replacement honeycomb foam tunnel core of a vehicle that has a damaged section of honeycomb core comprising the steps of
   a. disposing a plurality of removable rods within an area where the replacement honeycomb foam tunnel core is to be fabricated;
   b. wherein the rods are arrayed at an angle offset from normal to the path direction of load forces in the honeycomb core; and
   c. wherein the offset angle of the plurality of removable rods varies across the foam tunnel core;
   d. filling the area about the removable rods with syntactic foam;
   e. curing the syntactic foam; and
   f. retracting the rods to define a perforated replacement core.

47. The method of claim 46 further comprising the step of scraping the damaged section of honeycomb core, to form the area where the replacement foam tunnel core is to be fabricated.

48. The method of claim 46 wherein the step of filling the area with foam includes sequentially applying layers of foam, at least one layer having a different foam formulation.

49. The method of claim 46 wherein the rods are disposed in the area while the damaged section remains on the vehicle.

50. The method of claim 46 wherein the rods have a circular cross section.

51. The method of claim 46 wherein the rods have a hexagonal cross section.

52. The method of claim 46 where the rods have a graduated diameter along a longitudinal axis of the rods.

53. The method of claim 46 further comprising the step of placing sleeves over at least some of the rods prior to inserting the rods into the cavity, the sleeves remaining in the replacement honeycomb foam tunnel core after the rods are withdrawn from the sleeves.

54. A method for fabricating a replacement honeycomb foam tunnel core of a vehicle that has a damaged section of honeycomb core comprising the steps of;
   a. disposing a plurality of removable rods within an area where the replacement honeycomb foam tunnel core is to be fabricated at least some of the sods having sleeves placed thereover before being disposed in the area;
   b. filling the area about the removable rods with syntactic foam;
   c. curing the syntactic foam; and
   d. retracting the rods from the sleeves to define a perforated replacement core, the sleeves remaining in the replacement honeycomb foam tunnel core after the rods are retracted from the sleeves.

55. The method of claim 54 further comprising the step of scraping the damaged section of honeycomb core, to form the area where the replacement foam tunnel core is to be fabricated.

56. The method of claim 54 wherein the step of filling the area with foam includes sequentially applying layers of foam, at least one layer having a different foam formulation.

57. The method of claim 54 wherein the rods are disposed in the area while the damaged section remains on the vehicle.

58. The method of claim 54 wherein the rods have a circular cross section.

59. The method of claim 54 wherein the rods have a hexagonal cross section.

60. The method of claim 54 where the rods have a graduated diameter along a longitudinal axis of the rods.

61. The method of claim 54 wherein the offset angle is selected to regulate shear strength of the honeycomb structure.

62. The method of claim 54 wherein the offset angle of the plurality of rods varies across the foam tunnel core.

* * * * *